(12) United States Patent
Sebode

(10) Patent No.: US 6,428,114 B1
(45) Date of Patent: Aug. 6, 2002

(54) WHEEL

(75) Inventor: Frank Sebode, Heldenstein (DE)

(73) Assignee: Lightcon GmbH, Heldenstein (DE)

( * ) Notice: Subject to any disclaimer, the term of this patent is extended or adjusted under 35 U.S.C. 154(b) by 0 days.

(21) Appl. No.: 09/547,296

(22) Filed: Apr. 11, 2000

(30) Foreign Application Priority Data

Apr. 12, 1999 (DE) ........................................ 199 16 444

(51) Int. Cl.⁷ ................................................ B60B 1/00
(52) U.S. Cl. ........................... 301/64.705; 301/64.706; 301/64.201; 301/64.102
(58) Field of Search ............................. 301/64.1, 64.2, 301/64.3, 64.5, 64.7, 65, 73, 64.101, 64.102, 64.201, 64.203, 64.705, 64.704, 64.706

(56) References Cited

U.S. PATENT DOCUMENTS

| | | | | |
|---|---|---|---|---|
| 2,105,317 A | * | 1/1938 | Frank | 301/64.4 X |
| 3,771,843 A | * | 11/1973 | Clasper et al. | 301/64.3 X |
| 3,782,778 A | | 1/1974 | Tomozawa | |
| 3,915,511 A | * | 10/1975 | Clasper et al. | 301/64.3 X |
| D303,516 S | | 9/1989 | Arredondo, Jr. | |
| 5,104,199 A | * | 4/1992 | Schlanger | 301/64.704 |
| D352,021 S | | 11/1994 | Powers | |
| D368,883 S | | 4/1996 | Rhor | |
| D370,652 S | | 6/1996 | Londry | |
| 5,540,485 A | * | 7/1996 | Enders | 301/64.704 X |
| D372,697 S | | 8/1996 | Echazabal et al. | |
| 5,551,763 A | * | 9/1996 | Alsman | 301/64.7 |
| D384,931 S | | 10/1997 | Neeper | |
| D385,838 S | | 11/1997 | Cullen | |
| D387,319 S | | 12/1997 | Timm et al. | |
| D388,749 S | | 1/1998 | Kiser | |
| D389,101 S | | 1/1998 | Julien | |
| D397,663 S | | 9/1998 | Chrysanto | |
| D405,747 S | | 2/1999 | Sacco et al. | |
| D419,515 S | | 1/2000 | Brown | |
| 6,139,040 A | * | 10/2000 | Dempsey | 301/64.7 X |
| D438,155 S | | 2/2001 | Hanson | |
| D445,389 S | | 7/2001 | Stach | |

FOREIGN PATENT DOCUMENTS

| | | | | |
|---|---|---|---|---|
| DE | 3420402 A1 | | 12/1985 | |
| FR | 2 291 873 | | 6/1976 | |
| GB | 247400 | * | 2/1926 | 301/64.2 |
| WO | WO 96/08383 | | 3/1996 | |

OTHER PUBLICATIONS

Avallone, Eugene A. and Theodore Baumeister, III, Marks' Standard Handbook for Mechanical Engineers, 1996, McGraw–Hill Companies, Inc. 10th Edition, pp. 6–53 through 6–6–57 and 6–84 through 6–85.*

* cited by examiner

Primary Examiner—Stephen T. Gordon
Assistant Examiner—Patricia Engle
(74) Attorney, Agent, or Firm—Alston & Bird LLP

(57) ABSTRACT

A wheel, in particular for a bicycle, preferably for a motorcycle, with a hub, a rim, and spokes or a disk extending between the hub and rim. The wheel is vertically divided so as to include two wheel parts, and each of the two wheel parts comprises as integral parts one half of each of the hub, the spokes or the disk, and the rim. The wheel is designed and constructed to provide a simple and cost-favorable production, while ensuring the necessary stability or rigidity. The two wheel parts are made at least largely identical, and joined together exclusively in the region of the hub and rim.

24 Claims, 6 Drawing Sheets

WHEEL

BACKGROUND OF THE INVENTION

The present invention relates to a wheel, in particular for a bicycle, and preferably for a motorcycle, with a hub, a rim, and spokes or a disk extending between the hub and the rim. The wheel is vertically divided, and each of the two wheel parts comprises as integral parts one half of each of the hub, the spokes or the disk, and the rim.

Wheels of the above-described kind have been known for a long time in a large variety of types. For example, reference may be made to WO 96/08383. The wheel disclosed in WO 96/08383 is a wheel for bicycles, wherein differently designed and constructed wheel parts are joined by gluing. The parts of this known wheel as a whole are glued together, i.e., both in the region of the hub and the rim, as well as in the region of the spokes. In other words, the wheel parts are joined by gluing in all boundary or butt joints, so that the two wheel parts form together a homogeneous wheel per se.

The wheel as known from WO 96/08383, wherein the wheel parts are joined by gluing, may be suitable for use in bicycles. However, based on its all-around glued joints, this wheel exhibits an only limited strength or torsional resistance, which is in any event inadequate for use in a motorcycle. Furthermore, in the case of the known wheel, it is necessary to manufacture different wheel halves because of the selected joining technique and engagement of the wheel halves. This increases the manufacturing expenditure and, thus, the production costs.

It is an object of the present invention to design and construct and further develop a wheel that in some ways resembles the above-described wheel, and which is easy and yet cost-favorable to make, while ensuring the stability and rigidity required for use in a motorcycle.

SUMMARY OF THE INVENTION

The above and other objects and advantages of the invention are achieved by the provision of a wheel having two wheel parts, namely first and second wheel parts. The first wheel part comprises a first hub portion, a first rim portion extending around the first hub portion, and first structure, such as spoke members, connected between the first hub portion and the first rim portion. Likewise, the second wheel part comprises a second hub portion, a second rim portion extending around the second hub portion, and second structure, such as spoke members, connected between the second hub portion and the second rim portion. The first and second rim portions are connected and together function as a rim of the wheel. Likewise, the first and second hub portions are connected and together function as a hub of the wheel. The two wheel parts are interconnected exclusively in the region of the hub and rim.

It has been recognized by the present invention that for obtaining the necessary stability and strength or rigidity of the wheel, it will totally suffice when the two wheel parts are joined together exclusively in the region of the hub and the rim, and not in the region of the spokes. Such a construction, according to the invention, is based on the thought that it is possible to save material in the region of the spokes. Accordingly, in accordance with one aspect of the present invention, it is not necessary to join the two wheel parts in the region of the spokes. Instead, for purposes of saving material and reducing the weight, the region between the spoke halves is left open because this region contributes only little to the strength or rigidity of the wheel.

In accordance with another aspect of the invention, the two wheel parts can be made at least largely identical (i.e., substantially identical), when a connection is provided only in the region of the hub and the rim. The two wheel parts can be made initially identical such as by die casting the two wheel parts in the same die. Thereafter, the joining regions of the hub and rim can be machined or reworked so that it is possible to apply different joining techniques, as will be described further below.

As mentioned above, once the two wheel parts are joined they together form the hub and the rim of the resulting wheel. In accordance with another aspect of the invention, the wheel parts comprise each an inward extending joining region, and those joining regions engage each other to form the hub. In accordance with one example, each joining region is an inward extending, substantially cylindrical section, with the cylindrical section of one wheel part engaging over the cylindrical section of the other wheel part. In accordance with another example, the cylindrical section of one wheel part engages the cylindrical section of the other wheel part, such as in a recess thereof. In this instance, a kind of tongue and groove joint exists between the two wheel parts.

The two joining regions forming the hub can be interconnected in a force-locking and/or formfitting and/or material-engaging manner. For example, the joining regions of the wheel parts that form the hub can be slipped into or onto each other. Likewise, the joining regions of the wheel parts which form the hub can be pressed, screwed, riveted and/or glued together. A combination of the foregoing joining techniques can be used. Thus, besides gluing together the joining regions, they can additionally be screwed or riveted together.

The above-described connections can also be used in the region of the wheel rim. Accordingly, the wheel parts each include a joining region, which is preferably peripherally arranged, and those joining regions are joined to form the wheel rim. For example, the joining regions of the rim can abut and connect to each other in a formfitting and/or force-locking and/or material-engaging manner. As an additional example, the joining regions can be welded together with a notch, preferably a peripheral notch, being provided in the region of the butt joints for receiving a weld seam. To this extent, the weld seam can be placed into the notch and leveled outside the notch toward the smooth surface of the rim. Likewise, it is acceptable to glue, screw, and/or rivet together the joining regions of the rim, and these different joining techniques can be combined.

Between the joining regions of the wheel parts a sealing means can be provided for purposes of excluding air, such as for excluding the passage of air between the joining regions of the rim. More specifically, a peripheral seal can extend between the butt joints of the joining regions. To this end, the joining regions can comprise in their oppositely directed front surfaces corresponding recesses or grooves for receiving the sealing means. More specifically, a peripheral O-ring can be inserted as a compression seal. Another acceptable sealing means for excluding air can be a weld seam, such as the above-mentioned weld seam, extending around and connecting the joining regions of the rim.

In accordance with another aspect of the invention, in the furtherance of advantageously reducing weight, the spoke halves of the wheel parts abut at their ends, i.e., in the region of the hub and the rim, and otherwise are spaced at least slightly from one another. The spacing between the spoke halves can decrease from the hub toward the rim. The region between the spoke halves can be a hollow space, which permits reducing the weight to an extraordinary extent. However, the region between the spoke halves can also be filled. The filling material can be a lightweight and anticorrosive material, such as plastic.

In accordance with another aspect of the invention, the region between the spoke halves is filled exclusively in the edge zone, preferably in a sealing manner against humidity and dirt. Likewise, to this end, plastic can be used as a quasi sealing insert.

In order to increase stability while reducing the amount of material that is used, the spoke halves can have U-shaped or dish-shaped cross sections. To increase stability, the spoke halves can be provided with reinforcements extending in the longitudinal direction. To this extent, the spoke halves can be constructed with a W-shaped cross section, with the rigidity being increased by the longitudinally extending center bar.

In accordance with another aspect of the invention, the opposite spoke halves together have an approximately circular cross section, thereby favoring the rigidity of each spoke quite considerably. Likewise, the opposite spoke halves can have an approximately oval cross section.

In accordance with another aspect of the invention, the wheel is light weight because the wheel halves are made of aluminum or an aluminum alloy. Likewise, the wheel halves can be made of magnesium or a magnesium alloy. To increase strength, fiber-reinforced aluminum or magnesium materials can be used. The wheel halves can also be made of a carbon-fiber reinforced material. In this instance, plastic with embedded carbon fibers can also be used.

When the wheel halves are made of aluminum, magnesium, or corresponding alloys, the wheel halves can be produced by the die casting method. Before joining the wheel halves, a subsequent machining of the wheel halves can be performed, in particular to provide a suitable joining region for forming the hub and the rim.

BRIEF DESCRIPTION OF THE DRAWINGS

There exist various possibilities of improving and further developing the teaching of the present invention in an advantageous manner. To this end, reference may be made to the following description of two embodiments of the invention with reference to the drawings, in which.

DETAILED DESCRIPTION OF THE PREFERRED EMBODIMENTS

Figure 1:
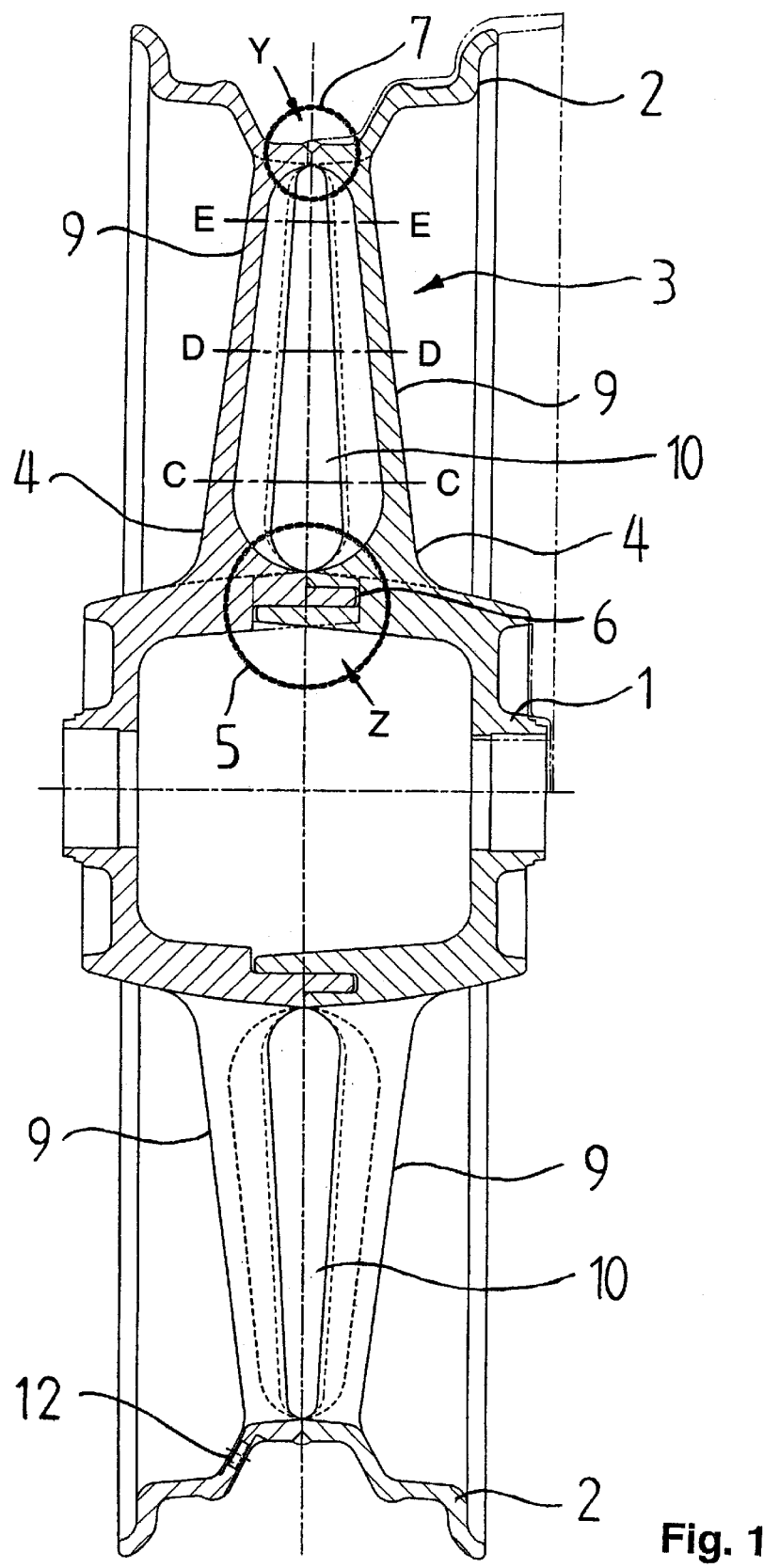
FIG. 1 is a schematic, cross sectional view of an embodiment of the wheel according to the invention.

FIG. 1 illustrates a wheel for a motorcycle. The wheel comprises a hub 1, a rim 2, and structure, which is illustrated in the form of spokes 3, extending between the hub 1 and rim 2. The structure between the hub 1 and the rim 2 can alternatively be a center disk. That is, it is possible to provide in the place of spokes 3 a center disk, which is, for example, perforated or contains recesses. As best seen in FIG. 1, the wheel is vertically divided in its center such that it comprises two wheel parts 4, and each of the two wheel parts 4 comprises as integral parts substantially one half of hub 1, spokes 3, and rim 2.

In accordance with the invention, the two wheel parts 4 are preferably designed and constructed to be at least largely identical (i.e., substantially identical). The two wheel parts are preferably joined together exclusively in the region of hub 1 and rim 2, i.e., not in the region of spokes 3.

Altogether, the figures show that for forming the hub 1, the wheel parts 4 comprise each an inward extending joining region 5, and that they fit into each other with the respective joining region 5. In this arrangement, the joining region 5 is designed and constructed as an inward extending, substantially cylindrical section. The cylindrical section of the one wheel part 4 engages the cylindrical section of the other wheel part 4, such as at a recess 6 of the other wheel part 4, in the way of a tongue and groove joint, as best seen in FIGS. 1 and 2.

It is most preferred that the joining regions 5 of the wheel parts 4, which form the hub 1, engage each other in a force-locking and/or formfitting and or material-engaging manner, with the joining regions 5 being slipped into or onto each other. In the embodiments illustrated in the figures, the joining regions 5 are pressed together to provide a force fit/press fit connection therebetween, so that no further measures are needed for joining the wheel parts 4. In addition or as an alternative, the wheel parts 4 can be screwed, riveted, or glued together. All possibilities of joining the two wheel parts 4 are possible.

Figure 3:
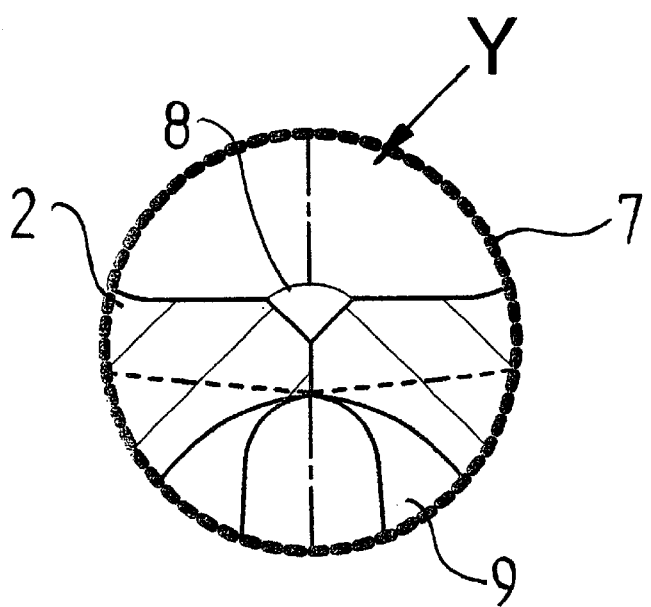
FIG. 3 is an enlarged view of detail Y of the wheel of FIG. 1.

As shown in FIGS. 1 and 3 together, the wheel parts, each having a joining region 7, are peripherally joined in the region of the rim 2. More specifically, the joining regions 7 of the rim 2 abut and are connected to each other in a formfitting, and/or force-locking and/or material-engaging manner. In the illustrated embodiments, the joining regions 7 of rim 2 are welded together. To this end, the joining regions 7 contain a peripheral notch in the region of their butt joints for receiving a weld seam 8. Likewise, it is possible that the joining regions 7 of rim 2 are glued, screwed, or riveted to each other. The foregoing joining techniques may also be used in combination so that one complements the other.

Figure 2:
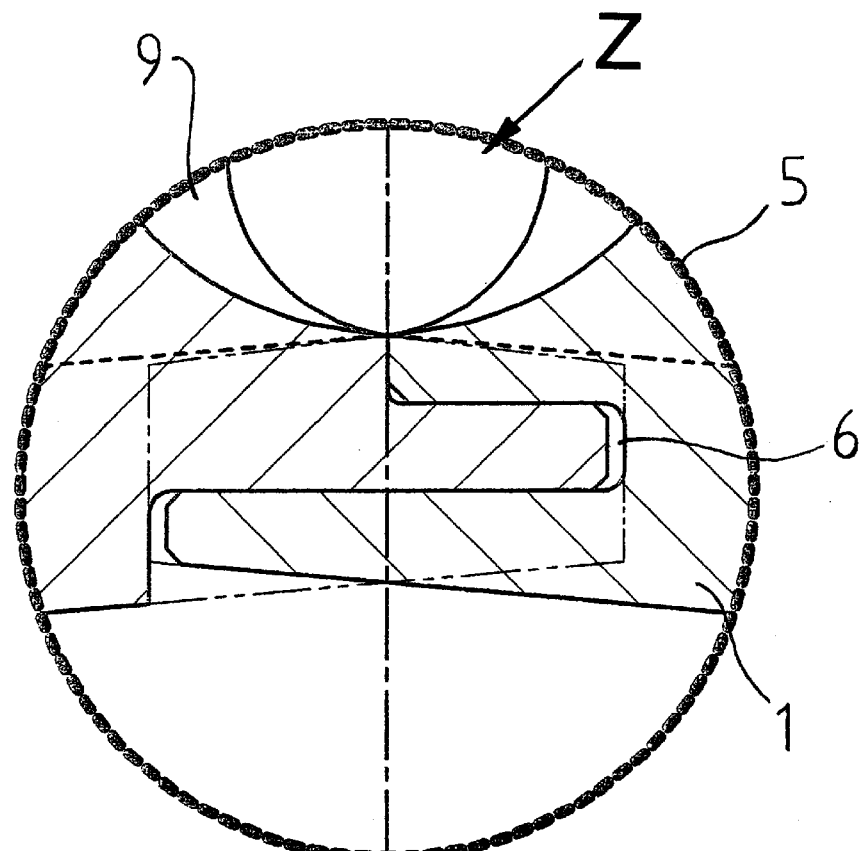
FIG. 2 is an enlarged view of detail Z of the wheel of FIG. 1.
Figure 4:
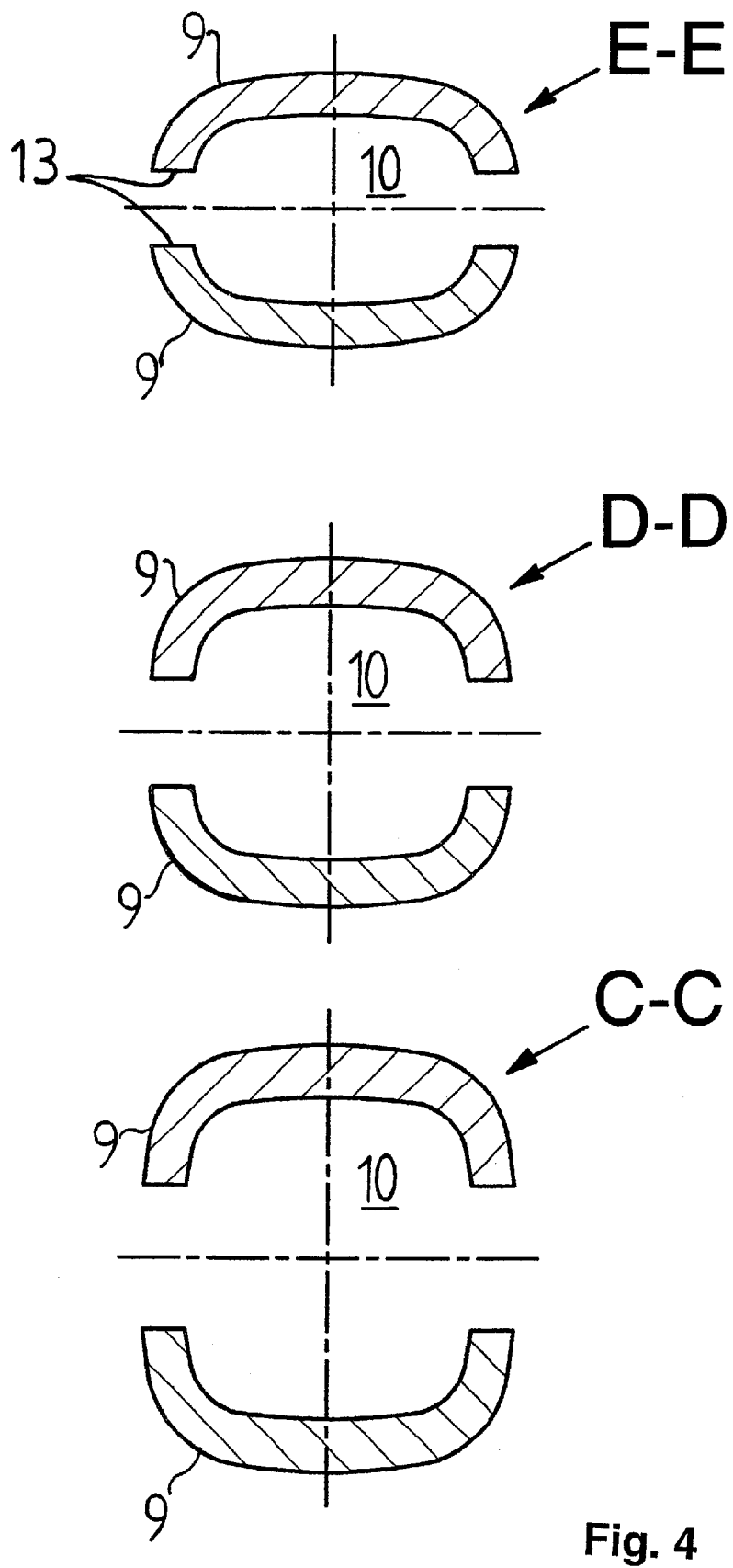
FIG. 4 shows sectional views along lines E—E, D—D, and C—C of the wheel of FIG. 1.
Figure 5:
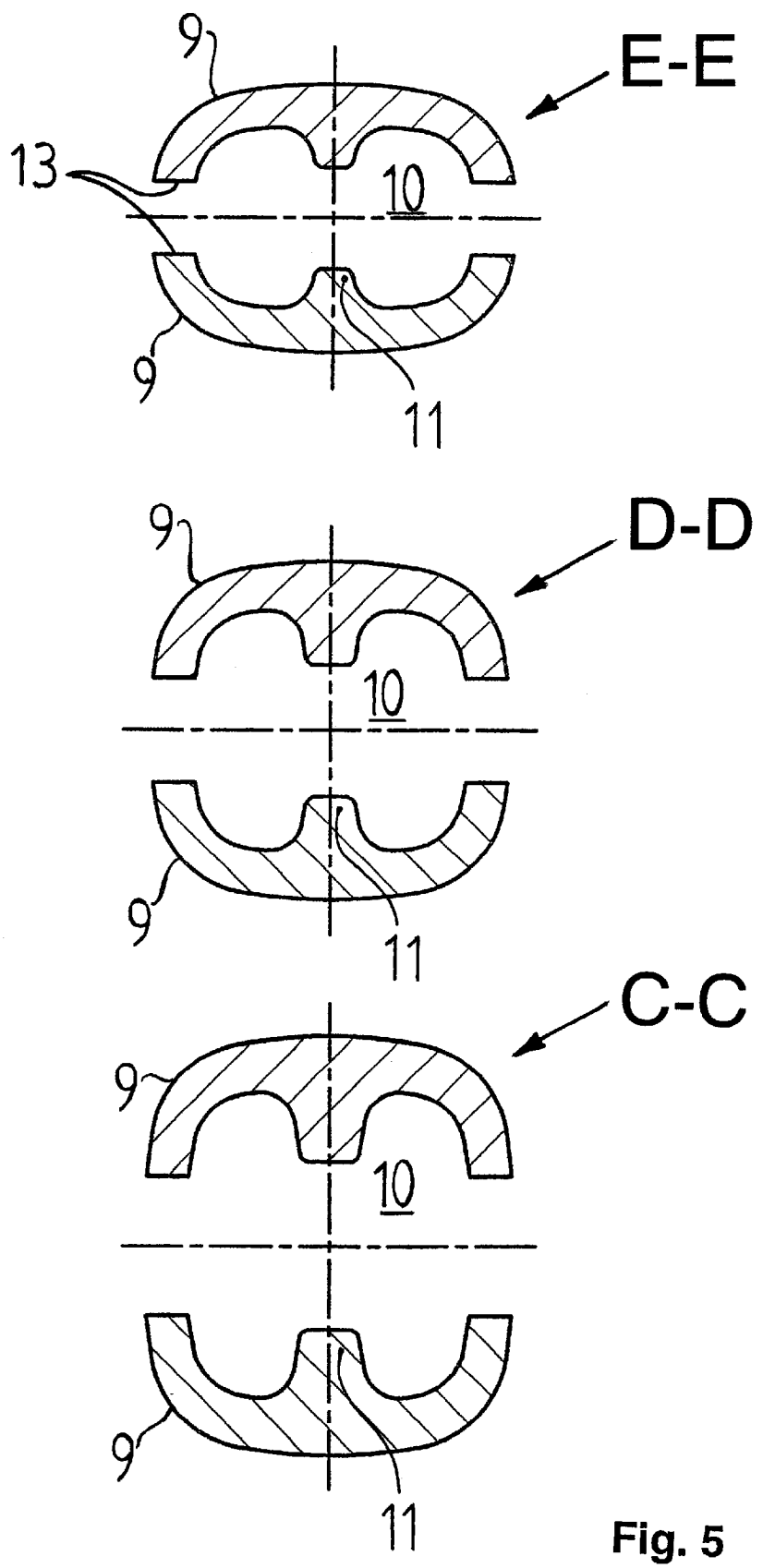
FIG. 5 shows sectional views of a second embodiment of a wheel according to the invention along lines E—E, D—D, and C—C of FIG. 7.
Figure 6:
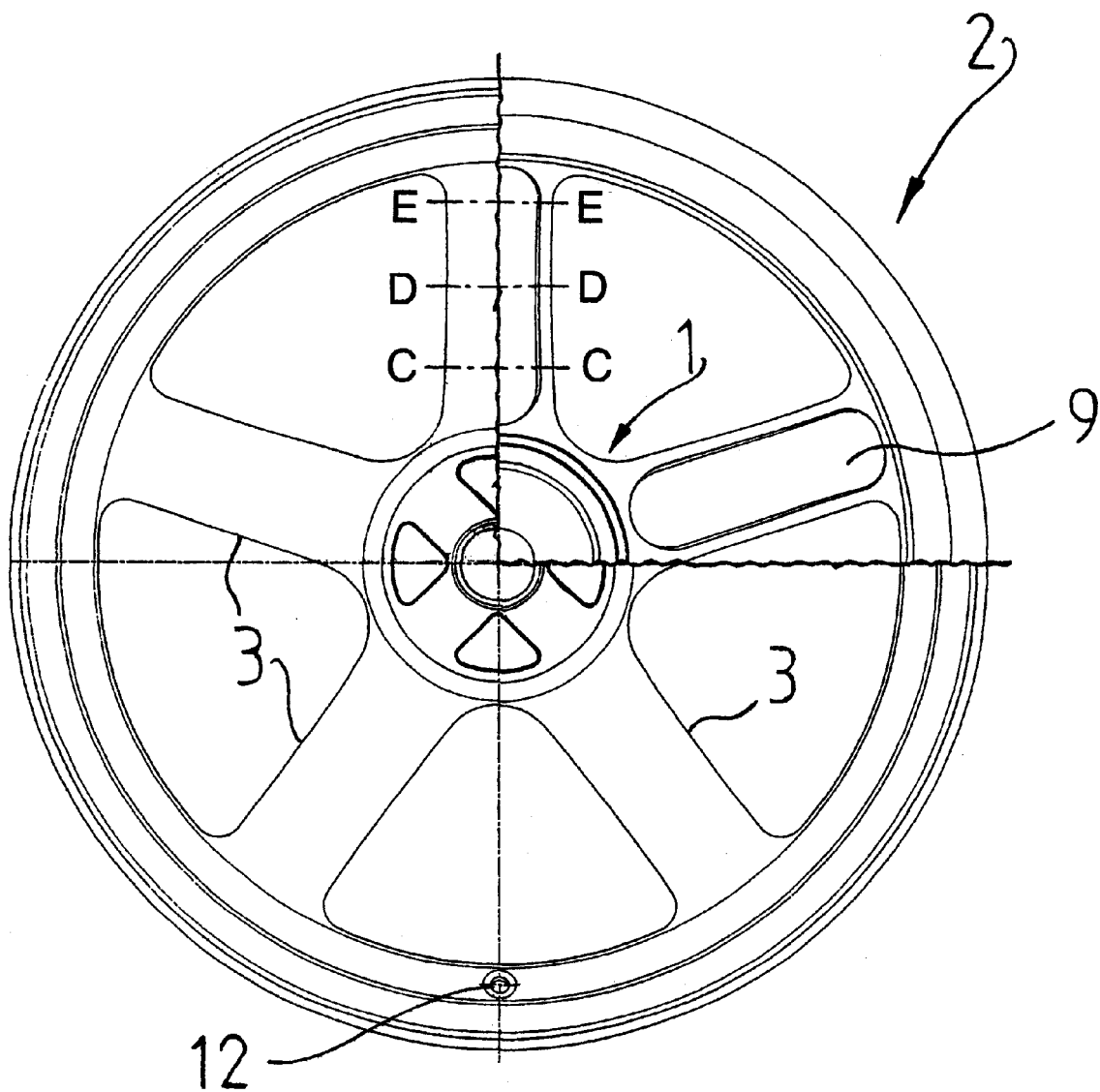
FIG. 6 is a combined front/rear view of the wheel of FIG. 1.
Figure 7:
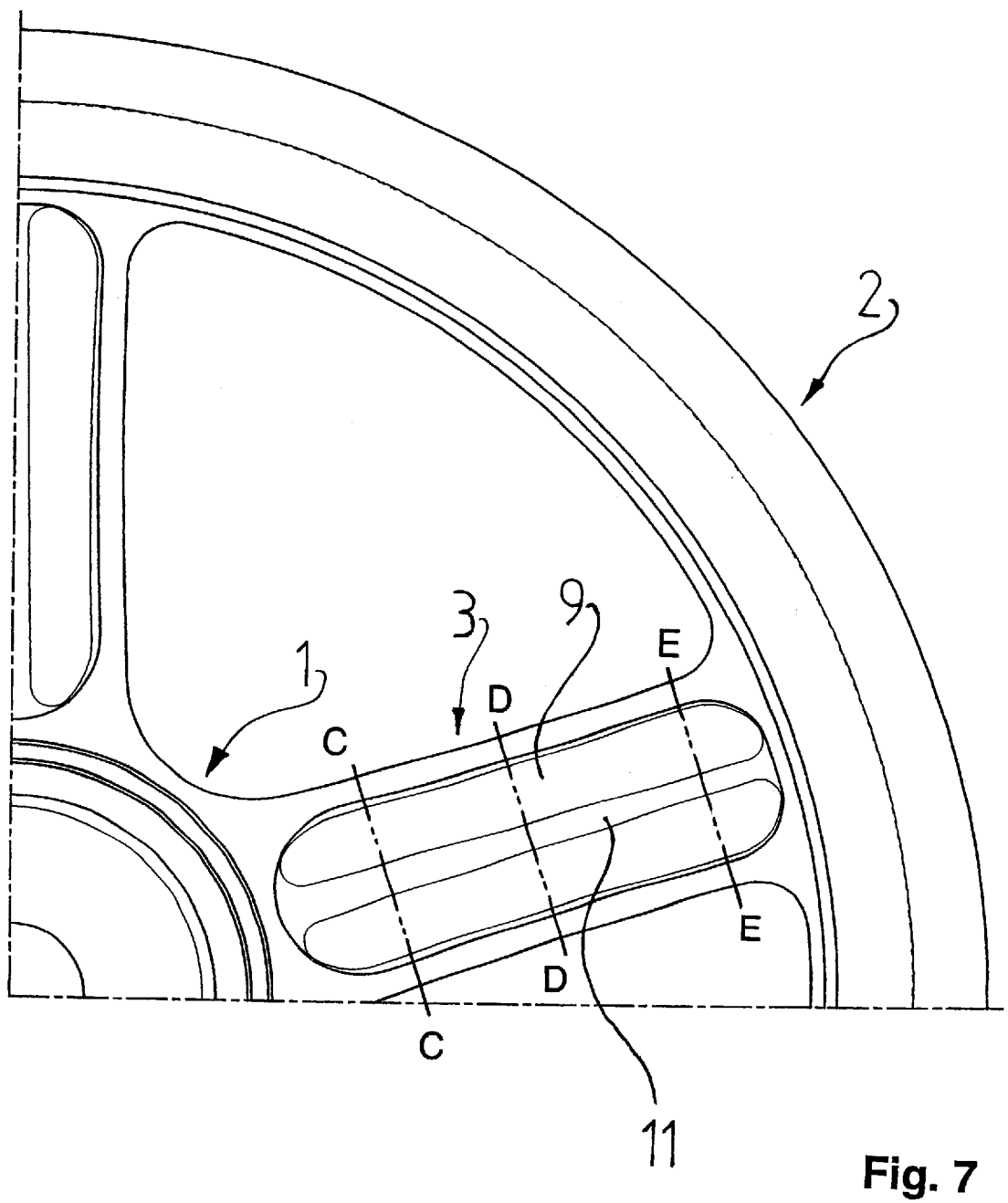
FIG. 7 is a schematic, partial rear view of the second embodiment of a wheel according to the invention with reinforced spokes according to the illustration of FIG. 5.

As best seen in FIGS. 1, 2, and 3, the spoke halves 9 of wheel parts 4 abut at their ends, i.e., in the region of hub 1 and rim 2, and otherwise they are spaced at least slightly from each other. FIGS. 4 and 5 are sectional views of the spokes 3 of two different embodiments, each along the lines E—E, D—D, and C—C of FIGS. 1, 6, and 7.

As can further be noted from FIGS. 4 and 5, the spacing between the spoke halves 9 decreases from the hub 1 toward the rim 2. Although the spacing of the spoke halves 9 decreases the ends 13, defined in a cross-section through an intermediate portion between the hub 1 and the rim 2 of the spoke halves 9, are spaced at least slightly from each other. The region between the spoke halves 9 forms a hollow space 10, which is preferably filled. This hollow space 10 can be filled with a material of lesser density than the material from which the wheel parts 4 are constructed. For example, the hollow spaces 10 can be filled with plastic.

In the embodiment of FIG. 5, the spoke halves 9 comprise reinforcements 11 that extend in the longitudinal direction.

As a result of this arrangement, the spoke halves 9 of the embodiment shown in FIG. 5 have a W-shaped cross section. Different reinforcements are likewise possible.

Likewise, it is possible that the opposite spoke halves 9 form together an approximately circular or oval cross section, and such a construction results in an extraordinarily high stability of the interconnected wheel parts 4.

In accordance with the illustrated embodiments, the wheel parts 4 can be made of a magnesium alloy by the die casting method. Aluminum or a suitable aluminum alloy, as well as fiber-reinforced plastic, are also suitable materials from which the wheel parts 4 can be made according to the invention.

In accordance with the illustrated embodiments, the rim 2 defines a hole 12 (FIGS. 1 and 6) that extends therethrough and is for receiving an air valve.

Finally, it should be emphasized that the foregoing embodiments are used to describe the claimed teaching, however without limiting the scope to the two specifically described embodiments.

What is claimed is:

1. A wheel comprising:
   a first wheel part comprising a first hub portion extending around the rotational axis of the wheel, a first rim portion extending around the first hub portion and extending around the rotational axis of the wheel, and a plurality of first spoke members connected between the first hub portion and the first rim portion; and
   a second wheel part comprising a second hub portion extending around the rotational axis of the wheel, a second rim portion extending around the second hub portion and extending around the rotational axis of the wheel, and a plurality of second spoke members connected between the second hub portion and the second rim portion,
   wherein:
   the first and second wheel parts are substantially identical,
   the first and second rim portions are initially separate from one another and thereafter are connected substantially along a plane that is perpendicular to the rotational axis of the wheel and together function as a rim of the wheel,
   the first and second hub portions are initially separate from one another and thereafter are connected substantially along the plane that is perpendicular to the rotational axis of the wheel and together function as a hub of the wheel,
   the wheel is absent of any substantial connection between the first and second spoke members of the first and second wheel parts,
   each of the first spoke members includes an inner portion connected to the first hub portion, an outer portion connected to the first rim portion, and an intermediate portion positioned between the inner and outer portions and extending substantially the entire radial distance therebetween,
   each of the second spoke members includes an inner portion connected to the second hub portion, an outer portion connected to the second rim portion, and an intermediate portion positioned between the inner and outer portions of the second spoke member and extending substantially the entire radial distance therebetween, and
   after the first and second hub portions are connected to form the hub and the first and second rim portions are connected to form the rim:
   the spoke members are arranged in pairs, with each pair including one of the first spoke members and one of the second spoke members that are adjacent, and
   for each pair, the first and second spoke members together generally extend in a radial direction outward from the hub, and the entirety of the intermediate portion of the first spoke member is spaced apart from the entirety of the intermediate portion of the second spoke member, so that in a cross-section through the intermediate portions of the first and second spoke members, with the cross-section being perpendicular to the radial direction:
   each of the spoke members includes opposite ends, each of the ends is spaced apart from all of the other of the ends, a first pair of the ends extend toward one another but do not contact one another, and a second pair of the ends extend toward one another but do not contact one another, with the first pair of the ends including one of the ends of the first spoke member and one of the ends of the second spoke member, and the second pair of the ends including the other end of the first spoke member and the other end of the second spoke member, so that a hollow space is defined between the first and second spoke members.

2. A wheel according to claim 1, wherein:
   the first hub portion comprises a joining region that extends inwardly toward the second hub portion, and
   the second hub portion comprises a joining region that extends inwardly toward the first hub portion, and the joining region of the second hub portion is connected to the joining region of the first hub portion.

3. A wheel according to claim 2, wherein:
   the joining region of the first hub portion is substantially cylindrical, and
   the joining region of the second hub portion is substantially cylindrical.

4. A wheel according to claim 3, wherein at least portion of the joining region of the first hub portion its over and engages at least a portion of the joining region of the second hub portion.

5. A wheel according to claim 3, wherein at least portion of the joining region of the first hub portion fits into and engages at least a portion of the joining region of the second hub portion so that the connection between the first and second hub portions comprises a tongue and groove joint.

6. A wheel according to claim 2, comprising connecting means for providing the connection between the joining region of the first hub portion and the joining region of the second hub portion.

7. A wheel according to claim 6, wherein the connecting means comprises a portion of the joining region of the first hub portion that is slipped into a portion of the joining region of the second hub portion.

8. A wheel according to claim 6, wherein the connecting means comprises a portion of the joining region of the second hub portion that is slipped onto a portion of the joining region of the first hub portion.

9. A wheel according to claim 6, wherein the connecting means comprises a portion of the joining region of the first hub portion that is press fit to a portion of the joining region of the second hub portion.

10. A wheel according to claim 1, wherein:
    the first rim portion comprises a peripheral joining region, and the second rim portion comprises a peripheral joining region, and the joining region of the second rim portion is connected to the joining region of the first rim portion.

11. A wheel according to claim 10, wherein the joining regions of the first and second rim portions abut one another.

12. A wheel according to claim 10, comprising connecting means for providing the connection between the joining regions of the first and second rim portions.

13. A wheel according to claim 12, wherein the connecting means comprises a weld.

14. A wheel according to claim 12, wherein the joining region of the first rim portion comprises a first peripheral notch, the joining region of the second rim portion comprises a second peripheral notch that is adjacent the first peripheral notch, and a weld is at least partially positioned in the first and second peripheral notches.

15. A wheel according to claim 10, comprising sealing means for excluding the passage of air between the joining regions of the first and second rim portions.

16. A wheel according to claim 1, wherein for each pair of the spoke members, the inner portion of the first spoke member abuts the inner portion of the second spoke member and the outer portion of the first spoke member abuts the outer portion of the second spoke member.

17. A wheel according to claim 1, wherein for each pair of the spoke members, the spacing between the intermediate portions of the first and second spoke members decreases as the distance from the hub increases.

18. A wheel according to claim 1, wherein for each pair of the spoke members, the first pair of the ends are in opposing face-to-face relation with one another, and the second pair of the ends are in opposing face-to-face relation with one another.

19. A wheel according to claim 1, wherein in the cross-section, the first and second spoke members each define a shape selected from the group consisting of generally U-shaped, generally W-shaped, and generally dish-shaped cross sections.

20. A wheel according to claim 1, wherein for each of the first and second spoke members a longitudinal direction is defined between the inner and outer portions thereof, and each of the first and second spoke members comprises a longitudinally extending reinforcement.

21. A wheel according to claim 20, wherein the first and second spoke members have generally W-shaped cross sections.

22. A wheel according to claim 1, wherein the first and second wheel parts are made from a material selected from the group consisting of aluminum, aluminum alloys, magnesium, and magnesium alloys.

23. A wheel according to claim 1, wherein the first and second wheel parts are cast parts.

24. A wheel according to claim 23, wherein the first and second wheel parts are die cast parts.

* * * * *

UNITED STATES PATENT AND TRADEMARK OFFICE
CERTIFICATE OF CORRECTION

PATENT NO. : 6,428,114 B1
DATED : August 6, 2002
INVENTOR(S) : Sebode

It is certified that error appears in the above-identified patent and that said Letters Patent is hereby corrected as shown below:

<u>Title page,</u>
Item [56], References Cited, OTHER PUBLICATIONS, "6-6-57" should read -- 6-57 --.

<u>Column 6,</u>
Lines 40 and 44, after "least" insert -- a --;
Line 41, "its" should read -- fits --.

Signed and Sealed this

Twenty-fifth Day of March, 2003

JAMES E. ROGAN
*Director of the United States Patent and Trademark Office*